United States Patent

Sandstrom et al.

[11] Patent Number: 5,885,389
[45] Date of Patent: Mar. 23, 1999

[54] TIRE WITH CHAFER COMPOSITION

[75] Inventors: Paul Harry Sandstrom; Neil Arthur Maly, both of Tallmadge, Ohio

[73] Assignee: The Goodyear Tire & Rubber Company, Akron, Ohio

[21] Appl. No.: 813,816

[22] Filed: Mar. 6, 1997

[51] Int. Cl.$^6$ .............................. B60C 1/00; B60C 15/06; C08L 9/00
[52] U.S. Cl. ........................... 152/543; 152/547; 525/236
[58] Field of Search ..................... 152/547, 543, 152/539, 564, 537, 525, 450, 209 R; 525/236

[56] References Cited

U.S. PATENT DOCUMENTS

| | | | |
|---|---|---|---|
| 4,220,564 | 9/1980 | Tanimoto et al. | 525/236 X |
| 4,468,496 | 8/1984 | Takeuchi et al. | 525/236 X |
| 4,481,327 | 11/1984 | Ogawa et al. | 525/432 |
| 4,898,223 | 2/1990 | Botzman et al. | 152/547 |
| 5,023,292 | 6/1991 | Hong et al. | 152/547 X |
| 5,023,301 | 6/1991 | Burlett et al. | 525/236 X |
| 5,049,610 | 9/1991 | Takaki et al. | 152/547 X |
| 5,066,721 | 11/1991 | Hamada et al. | 525/102 |
| 5,174,838 | 12/1992 | Sandstrom et al. | 152/209 R |
| 5,229,459 | 7/1993 | Sandstrom et al. | 525/236 X |
| 5,361,818 | 11/1994 | Tung et al. | 152/564 X |
| 5,386,865 | 2/1995 | Sandstrom et al. | 152/525 |
| 5,580,930 | 12/1996 | Kang et al. | 525/236 X |
| 5,626,697 | 5/1997 | Sandstrom et al. | 525/236 X |
| 5,753,761 | 5/1998 | Sandstrom et al. | 525/236 |

FOREIGN PATENT DOCUMENTS

| | | | |
|---|---|---|---|
| 0589291 | 3/1994 | European Pat. Off. | 152/547 |
| 57-77207 | 5/1982 | Japan | 152/525 |
| 3-28243 | 2/1991 | Japan | 152/547 |

*Primary Examiner*—Adrienne Johnstone
*Attorney, Agent, or Firm*—Henry C. Young, Jr

[57] ABSTRACT

A pneumatic rubber tire with a chafer positioned around at least a portion of its bead component and intended for contacting a rigid rim of a wheel, wherein said chafer is composed of a rubber composition which is based upon a combination of a specified trans 1,4-polybutadiene polymer and a high cis 1,4-polybutadiene rubber. The rubber composition for the tire chafer component may also contain cis 1,4-polyisoprene rubber and/or styrene/butadiene rubber.

3 Claims, No Drawings

TIRE WITH CHAFER COMPOSITION

FIELD

This invention relates to a pneumatic rubber tire having a chafer positioned around at least a portion of its bead component and intended for contacting a rigid rim of a wheel.

BACKGROUND

Pneumatic rubber tires conventionally have two spaced apart, relatively inextensible beads, usually composed of twisted, or cabled, metallic wires, which are surrounded by rubber components. A significant component which is conventionally positioned around a portion of the bead is the chafer. The chafer is a rubber composition conventionally designed to contact a rigid wheel rim and, therefore, interface between the tire and rim. Rather obviously, the chafer rubber composition must normally be very abrasion resistant, tough, and have a relatively high modulus while also having acceptable flex and rubber fatigue properties as well as having good resistance to cut growth.

The chafer rubber composition is conventionally composed of a diene-based rubber composition which is carbon black reinforced. The chafer rubber composition may optionally contain a textile fabric reinforcement for dimensional stability, where the textile fabric portion of the chafer is conventionally adjacent to the bead portion of the tire, leaving the rubber portion of the chafer to contact the rigid wheel rim when the tire is mounted on such rim and inflated.

Pneumatic tire chafers, their intended interface between the tire bead and rigid wheel rim, as well as their rather demanding physical properties, are considered herein to be well known to those skilled in such art.

Its rubber composition is conventionally composed, for example, of cis 1,4-polyisoprene and cis 1,4-polybutadiene rubber(s) in order to have good abrasion resistance and durability.

A particular concern for fabrication of the tire components, particularly the chafer rubber composition in the actual building of the tire is the green strength of the chafer rubber composition. The green strength of the chafer rubber in its uncured state is considered herein to be significantly important because it helps to keep the components in the bead area of the tire in position prior to curing.

It should be pointed out that it has been previously proposed to use trans 1,4-polybutadiene rubber in various components of a tire such as its tread and sidewall components.

However, it is not known to the inventors where trans 1,4-polybutadiene rubber is used in pneumatic tire chafer composition in a manner described herein.

Considerations of prior suggestions of use of trans 1,4-polybutadiene in tires may be found, for example, in U.S. Pat. No. 5,386,865.

DISCLOSURE AND PRACTICE OF THE INVENTION

In accordance with this invention, a pneumatic rubber tire is provided having a pair of spaced apart, relatively inextensible bead components, and a connecting carcass between said beads components, a circumferential tread intended, or designed, to be ground-contacting, and where a rubber chafer is positioned around at least a portion of each of said bead components and intended for contacting a rigid rim of a wheel, an improvement wherein said chafer is a rubber composition composed of, based upon 100 parts by weight of elastomer (phr) (A) about 2 to about 30, alternatively about 5 to about 25, phr of trans 1,4-polybutadiene polymer, (B) about 5 to about 75, alternatively about 10 to about 40, phr of cis 1,4-polybutadiene rubber, and (C) up to about 50, alternatively about 10 to about 40, phr of at least one of natural and/or synthetic cis 1,4-polyisoprene rubber and styrene/butadiene copolymer rubber, preferably emulsion polymerization prepared styrene/butadiene rubber.

Therefore, in one aspect, a tire rubber chafer component is provided which is composed of, based on 100 parts by weight rubber, (A) about 5 to about 25 phr of trans 1,4-polybutadiene polymer and (B) about 95 to about 75 phr of cis 1,4-polybutadiene rubber.

In another aspect, a tire rubber chafer component is provided which is composed of, based on 100 parts by weight rubber, (A) about 5 to about 25 phr of trans 1,4-polybutadiene polymer, (B) about 35 to about 65 phr of cis 1,4-polybutadiene rubber, and (C) about 10 to about 40 phr of cis 1,4-polyisoprene natural rubber.

In a further aspect, a tire rubber chafer component is provided which is composed of, based on 100 parts by weight rubber, (A) about 5 to about 25 phr of trans 1,4-polybutadiene polymer, (B) about 35 to about 65 phr of cis 1,4-polybutadiene rubber, and (C) about 10 to about 40 phr of styrene/butadiene copolymer rubber, preferably emulsion polymerization prepared styrene/butadiene rubber.

In an additional aspect, a tire rubber chafer component is provided which is composed of, based on 100 parts by weight rubber, (A) about 5 to about 25 phr of trans 1,4-polybutadiene polymer, (B) about 35 to about 65 phr of cis 1,4-polybutadiene rubber, (C) about 10 to about 20 phr of cis 1,4-polyisoprene natural rubber and (D) about 10 to about 30 phr of emulsion polymerization prepared styrene/butadiene rubber.

Thus, an elastomer composition for the chafer component for the tire is primarily based upon a combination of the trans 1,4-polybutadiene and cis 1,4-polybutadiene.

Further, the tire chafer component can also contain relatively minor amounts of cis 1,4-polyisoprene rubber, which is preferably natural rubber, and/or emulsion polymerization prepared styrene/butadiene rubber, so long as the basic rubber combination of the trans 1,4-polybutadiene and cis 1,4-polybutadiene is maintained.

The significance of utilization of the trans 1,4-polybutadiene in the chafer rubber composition is improved flex fatigue and ozone resistance.

Preferably, such trans 1,4-polybutadiene is characterized by having a microstructure of about 75 to about an 85 percent of its butadiene repeat units of a trans 1,4-isomeric structure, about 2 to about 18 percent of its units of a vinyl 1,2-structure and about 2 to about 18 percent of its units of a cis 1,4-structure and, in its uncured state, and typically at least one melting point in a range of 35° C. to about 60° C. Typically the preferred trans 1,4-polybutadiene polymer exhibits a first major melting point in a range of about 35° C. to about 45° C. and a second minor melting point in a range of about 55° C. to about 65° C. It is believed that the said first major melting point is a more significant characterization of the trans 1,4-polybutadiene polymer and that the said minor melting point may sometimes be relatively minimal and practically non-existent.

The significance of requiring the use of cis 1,4-polybutadiene rubber, in combination with the trans 1,4-polybutadiene polymer, is the combined benefit of good abrasion resistance as well as improved flex fatigue and ozone resistance.

Preferably the required cis 1,4-polybutadiene rubber is characterized by having a cis 1,4-content within a range of about 95 to about 99.5 percent of the cis 1,4-polybutadiene rubber and a Tg within a range of about −100° C. to about −110° C.

The significance of utilizing the optional cis 1,4-polyisoprene rubber, preferably natural rubber, is to provide, or enhance, tear strength for the cured chafer composition and tack and green strength for the uncured chafer rubber composition.

The significance of utilizing the optional emulsion polymerization prepared styrene/butadiene rubber is to provide, or enhance, stiffness and abrasion resistance for the cured chafer composition.

The said styrene/butadiene copolymer rubber conventionally has a styrene content within a range of about 5 to about 45 percent of the copolymer rubber. The butadiene portion of the copolymer may be composed of about 5 to about 50 vinyl 1,2-units. Conventionally, the copolymer rubber has a Tg within a range of about −75° C. to about −35° C.

For the purposes of this invention, an emulsion polymerization prepared styrene/butadiene rubber is preferred over an organic solvent polymerization prepared styrene/butadiene rubber because it has better processing characteristics relating to blending the rubber composition for the chafer.

The trans 1,4-polybutadiene utilized by this invention might be prepared, for example, by anionic polymerization or by batch or continuous polymerization of 1,3-butadiene in an organic solvent and in the presence of cobalt octoate and triethyl aluminum as a catalyst system with a para alkyl substituted phenol as a catalyst modifier.

The cis 1,4-polybutadiene utilized by this invention might be prepared, for example, by solution polymerization using a nickel, neodymium or titanium catalyst.

The styrene/butadiene rubber utilized by this invention might be prepared, for example, by copolymerizing styrene and 1,3-butadiene in an organic solvent solution or aqueous emulsion process.

For the purposes of this description, the compounded rubber compositions for the chafer rubber refer to the respective rubber compositions which have been compounded with conventional rubber compounding ingredients.

The rubber composition of the chafer component would be compounded by methods generally known in the rubber compounding art, such as mixing the sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black and optionally silica with a coupler optionally being used. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 20 phr. Such processing aids can include, for example, aromatic, naphthenic, and/or paraffinic processing oils. Typical amounts of reinforcing carbon black may be within a range of about 25 to about 75 phr. Silica, if used, may be used in an amount of about 5 to about 25 phr, often with a silica coupling agent. Representative silicas may be, for example, hydrated amorphous silicas, preferably precipitated silicas. Typical amounts of antioxidants comprise about 1 to about 5 phr. Representative antioxidants may be, for example, diphenyl-p-phenylenediamine and others such as, for example, those disclosed in the *Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of specified blends of rubbers in chafer compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05–0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Sometimes, the combination of zinc oxide, fatty acid, and accelerator(s) may be collectively referred to as curing aids.

Sometimes a combination of antioxidants, antiozonants and waxes may be collectively referred to as antidegradants.

The presence and relative amounts of rubber compounding ingredients are not considered to be an aspect of this invention which is more primarily directed to the utilization of specified blends of rubbers in pneumatic tire chafer rubber compositions, particularly the required combination of the trans 1,4-polybutadiene and cis 1,4-polybutadiene rubber with optional minor amounts of cis 1,4-polyisoprene rubber and emulsion polymerization prepared styrene/butadiene rubber.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Rubber compositions containing the materials reflected in Table 1 (Tables 1A, 1B and 1C) were prepared in an internal rubber mixer using three sequential, separate stages of addition of ingredients, namely, two non-productive mix stages and one productive mix stage. Cure behavior and cured properties for the compounds, or compositions, of Table 1 are shown in Table 2. The Control compound contains, as a rubber composition, a combination of cis 1,4-polybutadiene, natural rubber and emulsion SBR. Experimental A (Exp A) contains cis 1,4-polybutadiene, natural rubber, emulsion SBR and the trans 1,4-polybutadiene. Experimental B (Exp B) contains cis 1,4-polybutadiene emulsion SBR and trans 1,4-polybutadiene. The experimental compounds exhibit several advantages over the control. These include improved abrasion resistance and ozone resistance, which are critical properties for the chafer component of a tire. Experimental A also exhibits improved crack growth resistance as measured by PG flex, which is also a critical property for a tire chafer component.

The non-productive mixes were conducted for about 4 minutes to a temperature of about 160° C. The productive mix was conducted for about 2 minutes to a temperature of about 110° C.

TABLE 1A

First Non-Productive Mix

|  | Control | Exp. A | Exp. B |
|---|---|---|---|
| Cis 1,4-polybutadiene[1] | 30 | 30 | 40 |
| Natural rubber | 40 | 30 | 0 |
| Emulsion SBR[2] | 30 | 30 | 45 |
| Trans 1,4-polybutadiene[3] | 0 | 10 | 15 |
| Carbon black | 61 | 61 | 61 |
| Processing aids[4] | 16.7 | 16.7 | 16.7 |
| Zinc oxide | 3 | 3 | 3 |

TABLE 1B

Second Non-Productive Mix

|  | Control | Exp. A | Exp. B |
|---|---|---|---|
| Carbon black | 20 | 20 | 20 |
| Processing aids[5] | 3.5 | 3.5 | 3.5 |
| Antioxidant | 2.3 | 2.3 | 2.3 |

TABLE 1C

Productive Mix

|  | Control | Exp. A | Exp. B |
|---|---|---|---|
| Zinc oxide | 1.5 | 1.5 | 1.5 |
| Sulfur | 2.4 | 2.4 | 2.4 |
| Accelerators[6] | 1.4 | 1.4 | 1.4 |

[1]Cis 1,4-polybutadiene rubber obtained as Budene ® 1207 from The Goodyear Tire & Rubber Company;
[2]Emulsion SBR having a styrene content of about 23.5% obtained as PLF1502 from The Goodyear Tire & Rubber Company;
[3]Trans 1,4-polybutadiene having a trans content of 85%, a cis content of 2% and a vinyl content of 13%. It had a number average molecular weight of about 200,000, plus or minus about 10 percent, and a weight average molecular weight of about 420,000, plus or minus about 10 percent. It also had a Tg of about −75° C. and a melting point of about 41° C. as measured by DSC (differential scanning calorimetry);
[4]Includes processing oil, tackifier and peptizer;
[5]Includes processing oil, wax and fatty acid; and
[6]Sulfenamide type.

The blends recited in Table 1 were cured under conditions of elevated pressure and temperature of about 150° C. for about 36 minutes. Physical properties of the cured compositions are reported in the following Table 2.

TABLE 2

|  | Control | Exp. A | Exp. B |
|---|---|---|---|
| Rheometer, 150° C. | | | |
| Max torque | 46.0 | 47.4 | 50.6 |
| Min torque | 9.2 | 9.4 | 10.2 |
| $T_{90}$, mins | 16.0 | 18.6 | 21.5 |
| Stress-Strain | | | |
| Tensile strength, MPa | 14.6 | 14.3 | 12.9 |
| Elongation at break, % | 381 | 368 | 330 |
| 300% modulus, MPa | 12.0 | 12.2 | 12.8 |
| Hardness | | | |
| Room temperature | 64 | 64 | 66 |
| 100° C. | 60 | 60 | 62 |
| Rebound | | | |
| Room temperature | 42 | 44 | 44 |
| 100° C. | 58 | 58 | 57 |
| Strebler adhesion | | | |
| Tear resistance, N | 54 | 55 | 51 |
| PG flex, 93° C. | | | |
| Mins to failure | 120 | >240 | 120 |
| Cyclic ozone | | | |
| Days to failure | 10 | 15 | 15 |
| DIN abrasion | | | |
| Relative volume loss | 101 | 94 | 78 |

EXAMPLE II

Rubber compositions containing the materials reflected in Table 3 (Tables 3A, 3B and 3C) were prepared in an internal mixer using three sequential, separate stages of addition as in Example I. Cure behavior and cured properties for the compounds of Table 3 are shown in Table 4. The control compound contains a blend of 1,4-polybutadiene and natural rubber. Experimental C composition contains cis 1,4-polybutadiene emulsion SBR and trans 1,4-polybutadiene. Experimental D composition contains cis 1,4-polybutadiene and trans 1,4-polybutadiene. The experimental compounds C and D exhibit certain advantages over the Control composition. Such advantages include improved abrasion resistance and improved ozone resistance. Experimental D composition also has improved PG flex verses the Control compound.

The non-productive mixes were conducted for about 4 minutes to a temperature of about 160° C. The productive mix was conducted for about 2 minutes to a temperature of about 110° C.

TABLE 3A

First Non-Productive Mix

|  | Control | Exp. C | Exp. D |
|---|---|---|---|
| Cis 1,4-polybutadiene | 75 | 75 | 75 |
| Natural rubber | 25 | 0 | 0 |
| Emulsion SBR | 0 | 10 | 0 |
| Trans 1,4-polybutadiene | 0 | 15 | 25 |
| Carbon black | 60 | 60 | 60 |
| Processing aids[1] | 11 | 11 | 11 |

TABLE 3B

Second Non-Productive Mix

|  | Control | Exp. C | Exp. D |
|---|---|---|---|
| Carbon black | 20 | 20 | 20 |
| Processing aids[2] | 8.5 | 8.5 | 8.5 |
| Antioxidant | 3 | 3 | 3 |

TABLE 3C

Productive Mix

|  | Control | Exp. C | Exp. D |
|---|---|---|---|
| Antioxidant | 0.8 | 0.8 | 0.8 |
| Zinc oxide | 5 | 5 | 5 |
| Accelerator[3] | 1.7 | 1.7 | 1.7 |
| Sulfur | 2 | 2 | 2 |
| Retarder | 0.1 | 0.1 | 0.1 |

[1]Aromatic processing oil;
[2]Includes wax, tackifier and fatty acid; and
[3]Sulfenamide type.

The blends recited in Table 3 were cured under conditions of elevated pressure and temperature of about 150° C. for about 36 minutes. Physical properties of the cured compositions are reported in the following Table 4.

TABLE 4

|  | Control | Exp. A | Exp. B |
|---|---|---|---|
| Rheometer, 150° C. | | | |
| Max torque | 54.8 | 58.3 | 60.2 |
| Min torque | 18.3 | 18.8 | 22.3 |
| T$_{90}$, mins | 13.0 | 18.1 | 17.4 |
| Stress-Strain | | | |
| Tensile strength, MPa | 16.3 | 16.2 | 15.9 |
| Elongation at break, % | 423 | 391 | 380 |
| 300% modulus, MPa | 12.2 | 13.3 | 13.7 |

TABLE 4-continued

|  | Control | Exp. A | Exp. B |
|---|---|---|---|
| Hardness | | | |
| Room temperature | 73 | 73 | 74 |
| 100° C. | 66 | 67 | 69 |
| Rebound | | | |
| Room temperature | 39 | 39 | 39 |
| 100° C. | 53 | 53 | 52 |
| Strebler adhesion | | | |
| Tear resistance, N | 141 | 128 | 134 |
| PG flex, 93° C. | | | |
| Mins to failure | 240 | 120 | >240 |
| Cyclic ozone | | | |
| Days to failure | 10 | >20 | >20 |
| DIN abrasion | | | |
| Relative volume loss | 84 | 78 | 66 |

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a pair of spaced apart, relatively inextensible bead components, and a connecting carcass between said bead components and a rubber chafer positioned around at least a portion of each of said bead components intended for contacting a rigid rim of a wheel, wherein said chafer is a rubber composition composed of, based on 100 parts by weight rubber, (A) about 5 to about 25 phr of trans 1,4-polybutadiene polymer having at least a 70 percent trans 1,4-content and at least one melting point within a range of about 35° to about 65° C., (B) about 35 to about 65 phr of cis 1,4-polybutadiene rubber, (C) about 10 to about 20 phr of natural cis 1,4-polyisoprene rubber and (D) about 10 to about 30 phr of emulsion polymerization prepared styrene/butadiene copolymer rubber.

2. The tire of claim 1 wherein, for said chafer composition, said trans 1,4-polybutadiene polymer is such that about 75 to about 85 percent of its butadiene repeat units are of a trans 1,4-isomeric structure, about 2 to about 18 percent of its units are of a vinyl 1,2-structure and about 2 to about 18 percent of its units are of a cis 1,4-structure in its uncured state and said at least one melting point is in a range of about 35° C. to about 60° C.

3. The tire of claim 2 wherein, for said chafer composition, the trans 1,4-polybutadiene polymer at least one melting point is a first major melting point in a range of about 35° C. to about 45° C. and a second minor melting point in a range of about 55° C. to about 65° C.

* * * * *